US010232884B2

(12) United States Patent
Smith et al.

(10) Patent No.: US 10,232,884 B2
(45) Date of Patent: Mar. 19, 2019

(54) CHASSIS AND METHOD OF DESIGNING MAIN BEAM FOR SAME

(71) Applicant: Fontaine Engineered Products, Inc., Jasper, AL (US)

(72) Inventors: John R. Smith, Jasper, AL (US); John Clifford Denson, Birmingham, AL (US)

(73) Assignee: Fontaine Engineered Products, Inc., Jasper, AL (US)

( * ) Notice: Subject to any disclaimer, the term of this patent is extended or adjusted under 35 U.S.C. 154(b) by 243 days.

(21) Appl. No.: 15/076,049

(22) Filed: Mar. 21, 2016

(65) Prior Publication Data

US 2016/0311470 A1 Oct. 27, 2016

Related U.S. Application Data

(60) Provisional application No. 62/151,146, filed on Apr. 22, 2015.

(51) Int. Cl.
*B62D 21/04* (2006.01)
*B62D 21/20* (2006.01)
(Continued)

(52) U.S. Cl.
CPC ............ *B62D 21/20* (2013.01); *B62D 21/03* (2013.01); *B62D 21/04* (2013.01); *B62D 53/068* (2013.01)

(58) Field of Classification Search
CPC ...... B62D 53/068; B62D 21/20; B62D 21/04; B62D 21/03
(Continued)

(56) References Cited

U.S. PATENT DOCUMENTS 3,655,214 A * 4/1972 Lane .................... B60P 1/6427
280/43.23
4,049,285 A 9/1977 Chieger
(Continued)

FOREIGN PATENT DOCUMENTS

DE 202007001455 U1 7/2007
WO 2011051828 A1 5/2011

OTHER PUBLICATIONS

Avila, Elliot,"Design of a Tricycle Chassis Using Computer-Aided Design and Finite Element Analysis," Department of Mechanical Engineering, Massachusetts Institute of Technology, Jun. 2014.
(Continued)

*Primary Examiner* — Toan C To
(74) *Attorney, Agent, or Firm* — Andrus Intellectual Property Law, LLP (57) ABSTRACT

A method for designing a main body of a trailer, trailer chassis, or like transportable load-supporting system includes selecting a known design of a transportable load-supporting system's main frame. The method includes developing a monocoque main beam having moments of inertia that are respectively greater than or substantially equal to the moments of inertia of the known main frame. Deflections of the known main frame and of the monocoque main beam in response to application of a torsional load, a vertical load, and a lateral load are then determined. Crossmembers can be added to the monocoque main beam until the deflection of the monocoque main beam is less than or substantially the same as the deflection of the known main frame. A monocoque main beam designed according to the method is also disclosed.

19 Claims, 6 Drawing Sheets

(51) Int. Cl.
*B62D 21/03* (2006.01)
*B62D 53/06* (2006.01)

(58) Field of Classification Search
USPC .................. 280/785, 789, 793, 797, 800
See application file for complete search history.

(56) References Cited

U.S. PATENT DOCUMENTS

| | | | | |
|---|---|---|---|---|
| 4,838,578 | A * | 6/1989 | Baxter | B62D 53/068 280/149.2 |
| 5,071,164 | A | 12/1991 | Gregg | |
| 5,215,331 | A * | 6/1993 | Pittman | B60G 11/225 280/788 |
| 5,322,314 | A * | 6/1994 | Blum | B62D 21/20 280/400 |
| 5,611,570 | A | 3/1997 | Garcia | |
| 6,786,291 | B1 | 9/2004 | Linden et al. | |
| 8,186,747 | B2 | 5/2012 | Bloodworth et al. | |
| 8,562,022 | B2 | 10/2013 | Nadeau et al. | |
| 8,857,893 | B2 | 10/2014 | Reiman et al. | |
| 8,910,740 | B2 | 12/2014 | Ehl | |
| 9,156,607 | B2 | 10/2015 | Adams | |
| 9,783,238 | B2 * | 10/2017 | Garceau | B62D 21/20 |
| 2004/0261267 | A1 * | 12/2004 | Crean | B62D 21/02 29/897.2 |
| 2005/0082814 | A1 * | 4/2005 | Ramsey | B62D 53/068 280/793 |
| 2013/0119650 | A1 * | 5/2013 | Garceau | B60G 11/225 280/789 |
| 2013/0300097 | A1 * | 11/2013 | Garceau | B62D 21/02 280/789 |
| 2014/0001731 | A1 * | 1/2014 | Booher | B62D 53/061 280/433 |
| 2014/0125091 | A1 | 5/2014 | Aloy | |

OTHER PUBLICATIONS

Denson, John Clifford, "Twistlock Assembly and Method for Coupling a Twistlock to a Shipping Unit," Unpublished U.S. Appl. No. 14/680,616, filed Apr. 7, 2015.

* cited by examiner

CHASSIS AND METHOD OF DESIGNING MAIN BEAM FOR SAME

CROSS-REFERENCE TO RELATED APPLICATION

The present application claims the benefit of U.S. Provisional Application Ser. No. 62/151,146, filed Apr. 22, 2015, which is hereby incorporated herein by reference.

FIELD

The present disclosure relates to trailers, trailer chassis, and similar transportable load-supporting systems such as chassis structures, and more particularly to intermodal chassis structures. Similar design concepts could be applied to trailers or other structural frames/systems as well.

BACKGROUND

International Patent Application Publication WO2011/051828 discloses a support frame for a vehicle having an elongate hollow load bearing support member, the support member being generally horizontally disposed in relation to a support surface for supporting a load to be conveyed. The support frame includes mounting means for mounting the support member to the suspension frame assembly of the vehicle. The hollow support member is internally segmented to define a plurality of stowage compartments for stowing one or more types of transportable goods, preferably flowable substances, in use.

German Utility Model Publication DE202007001455U1 discloses a frame, in particular for a trailer, comprising an upper part designed as shell with integrated axle bearings. The longitudinally positioned upper frame part is made of a metal sheet bent into a unit open at its lower side. A king pin is located at the front for joining the trailer to a pulling vehicle. Three pairs of extensions extend vertically from the lower side of the frame and can be used as axle bearings. Transverse support elements are inserted between each pair of extensions.

U.S. Pat. No. 8,857,893 discloses a chassis, which generally comprises two I-beams spaced apart by plural cross members. A dual-axle bogie is positioned toward the rear of chassis and a square-legged extendible landing gear is positioned toward the front of chassis, aft of the kingpin to which a heavy duty truck tractor can be pivotally secured. Two cross beams are also provided on which a container may rest during transport. Landing gear permits the chassis to sit level and allows elevation of the chassis so that a tractor can be attached to and detached from the chassis.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter. For example, the methodology described herein below may be applied to any number of beam designs or trailer assemblies using the same methods and techniques.

In one example of the present disclosure, a method for designing a main body of a trailer, trailer chassis, or like transportable load-supporting system is disclosed. The method includes selecting a known design of a main frame of a transportable load-supporting system that complies with industry standards regarding gross weight capacity. The method next includes developing a monocoque main beam having a polar moment of inertia, a vertical bending moment of inertia, and a lateral bending moment of inertia that are respectively greater than or substantially equal to a polar moment of inertia, a vertical bending moment of inertia, and a lateral bending moment of inertia of the known main frame. The method includes obtaining a deflection of the known main frame and a deflection of the monocoque main beam in response to application of at least one of a torsional load, a vertical load, and a lateral load to the known main frame and to the monocoque main beam. The method also includes adding cross-members to the monocoque main beam until the deflection of the monocoque main beam is less than or substantially the same as the deflection of the known main frame.

In another example of the present disclosure, an intermodal chassis includes a single longitudinally-extending main beam having a cross-sectional shape designed to limit one or more of vertical, lateral, and torsional deflections of the main beam, which deflections result from loadings due to acceleration of the chassis by a vehicle and handling of an intermodal container supported by the chassis. A gooseneck assembly is coupled to a front end of the main beam, which is configured to support a front end of the intermodal container. A rear bolster assembly is coupled to a rear end of the main beam, which is configured to support a rear end of the intermodal container. The main beam is designed such that the deflections of the main beam are less than or substantially the same as one or more of respective vertical, lateral, and torsional deflections of a known main frame of an intermodal chassis that complies with industry standards regarding intermodal trailer gross weight limits.

BRIEF DESCRIPTION OF THE DRAWINGS

The present disclosure is described with reference to the following Figures. The same numbers are used throughout the Figures to reference like features and like components.

DETAILED DESCRIPTION OF THE DRAWINGS

Trailer chassis are used as the backbone of many different types of trailers, such as flatbed trailers, drop deck trailers, intermodal trailers, etc. An intermodal trailer chassis, for example, is used to hold and transport a box-like intermodal container, which is a freight container designed and constructed to be used interchangeably in two or more modes of transportation. The container is supported by a main frame of the chassis structure as well as a front gooseneck and a rear bolster having arms that extend outwardly from either side of the main frame. Twistlocks, for example located at the outermost extent of each of the bolsters' arms, can be used to lock the container to the chassis. Support legs ("landing gear") hold up a front of the main frame when the chassis is not coupled to a vehicle. The rear of the main frame is coupled to and supported by a suspension assembly, including a bogey connected to axles and wheels. Instead of a container, the main frame can alternatively support an intermodal flat rack, such as that disclosed in U.S. Pat. No. 9,156,607, assigned to the present Applicant.

Figure 1:
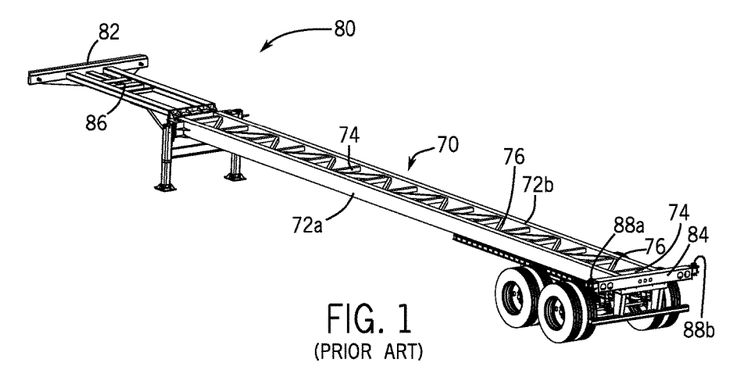
FIG. 1 illustrates a prior art chassis.

As shown in FIG. 1, a conventional intermodal chassis main frame section 70 includes longitudinal members 72a, 72b (most often I-beams or C-beams) that are tied together laterally and diagonally with additional, structural members positioned both cross-wise (74) and on-angle (76) to the longitudinal members 72a, 72b. If all of these members are considered as a single system, it is possible to characterize their combined effect for longitudinal, lateral, and torsional rigidities. In doing so, and in studying industry requirements and conventional main frame systems that are in use today, it is possible to establish baseline requirements for these rigidities. With these requirements known, a different cross-sectional profile for the main body of the chassis can be developed to suit these needs, while adding benefits to the manufacturing process and end-use product. For example, today's intermodal chassis main frame structures are constructed with more than sixty parts and approximately 300 inches of weld, requiring cumbersome processing to orient the system in order to optimize production and weld strength. The present design reduces the number of parts by approximately 60% and reduces weld length by approximately 75% because it is designed as a monocoque single beam that carries loads mainly on its skin.

In order to develop the present design, the present inventors first conducted a detailed finite element analysis (FEA) of a conventional chassis 80, such as that described above and shown in FIG. 1. The FEA showed that the majority of load-carrying capacity is focused around the front gooseneck 82, the rear bolster 84, the rear-most sections of the longitudinal members 72a, 72b, and the king pin nest 86. Thereafter, with the results of the FEA in mind, the present inventors designed a monocoque main beam 12 (see FIGS. 3 and 5-9) that is rigid enough to resist vertical, lateral, torsional, and combined loadings due to vehicle acceleration and handling loads imposed by an intermodal container. For example, the deformation of the modeled prior art chassis 80 due to application of a torsional load was used, along with the chassis' geometric and structural properties, to calculate a polar moment of inertia of the prior art main frame 70. The amount of deflection of the prior art main frame 70 when a vertical load was applied was used to calculate the vertical bending moment of inertia. The amount of deflection of the prior art main frame 70 when a lateral load was applied was used to calculate the lateral bending moment of inertia. Each of these moments of inertia (MOI) was then used to develop a cross-sectional shape of a monocoque single beam that would exhibit similar, if not greater, moments of inertia. The newly developed cross-sectional shape of the present design (see FIG. 3) was then virtually modeled and tested using FEA under the same load cases as those used to analyze the conventional chassis design, in order to ensure that no more deflection than that exhibited by the prior art main frame would occur.

Figure 4:
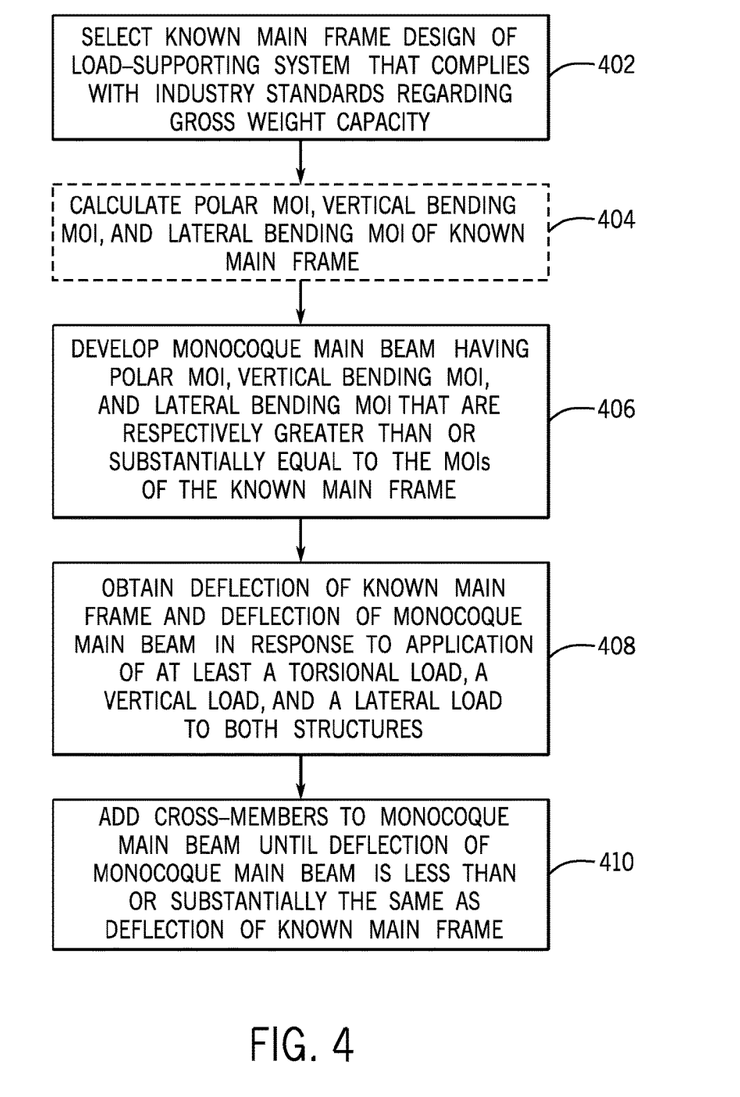
FIG. 4 illustrates a method for designing a chassis according to the present disclosure.
Figure 5:
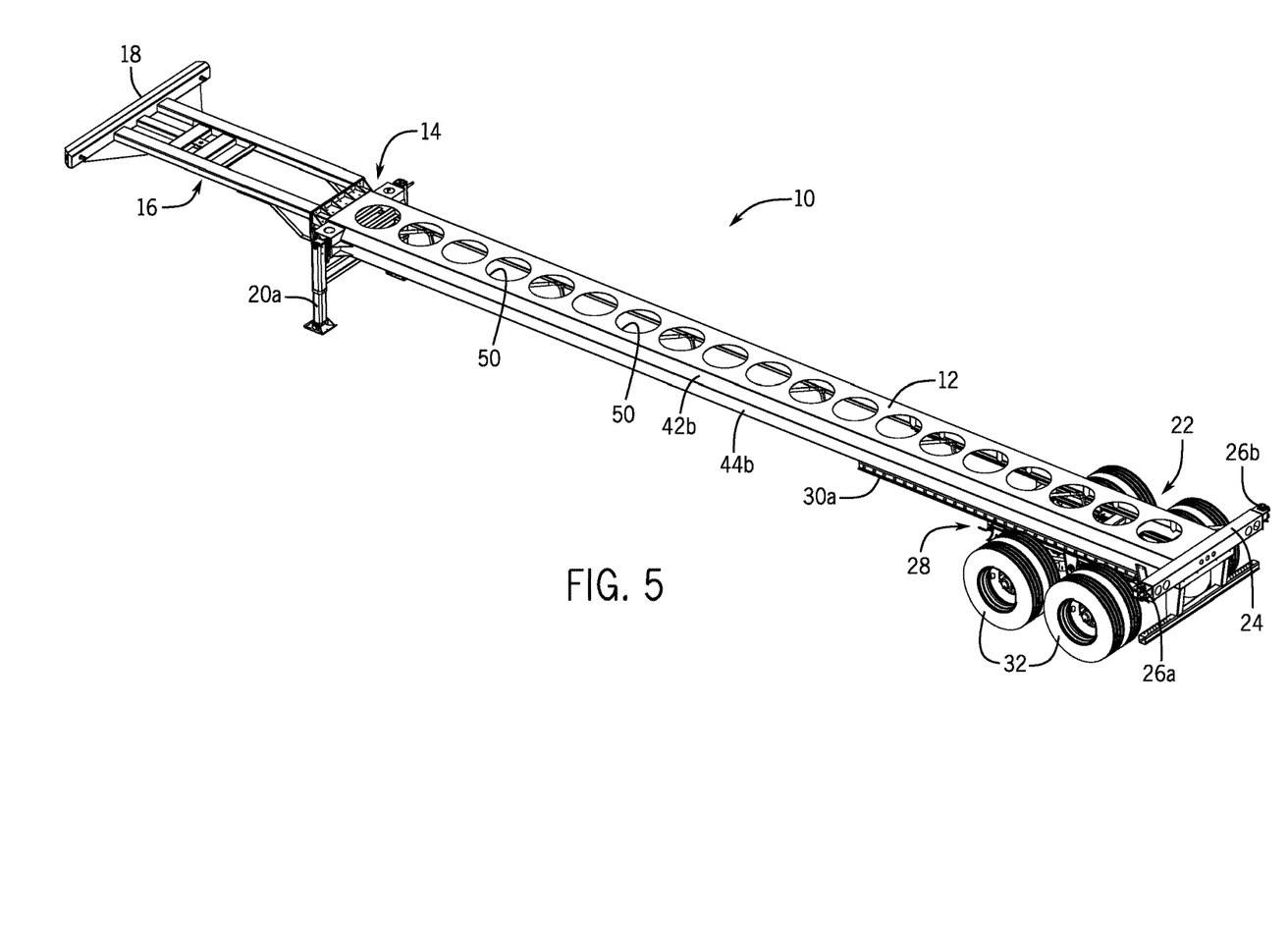
FIG. 5 illustrates an intermodal chassis designed according to the present disclosure.
Figure 6:
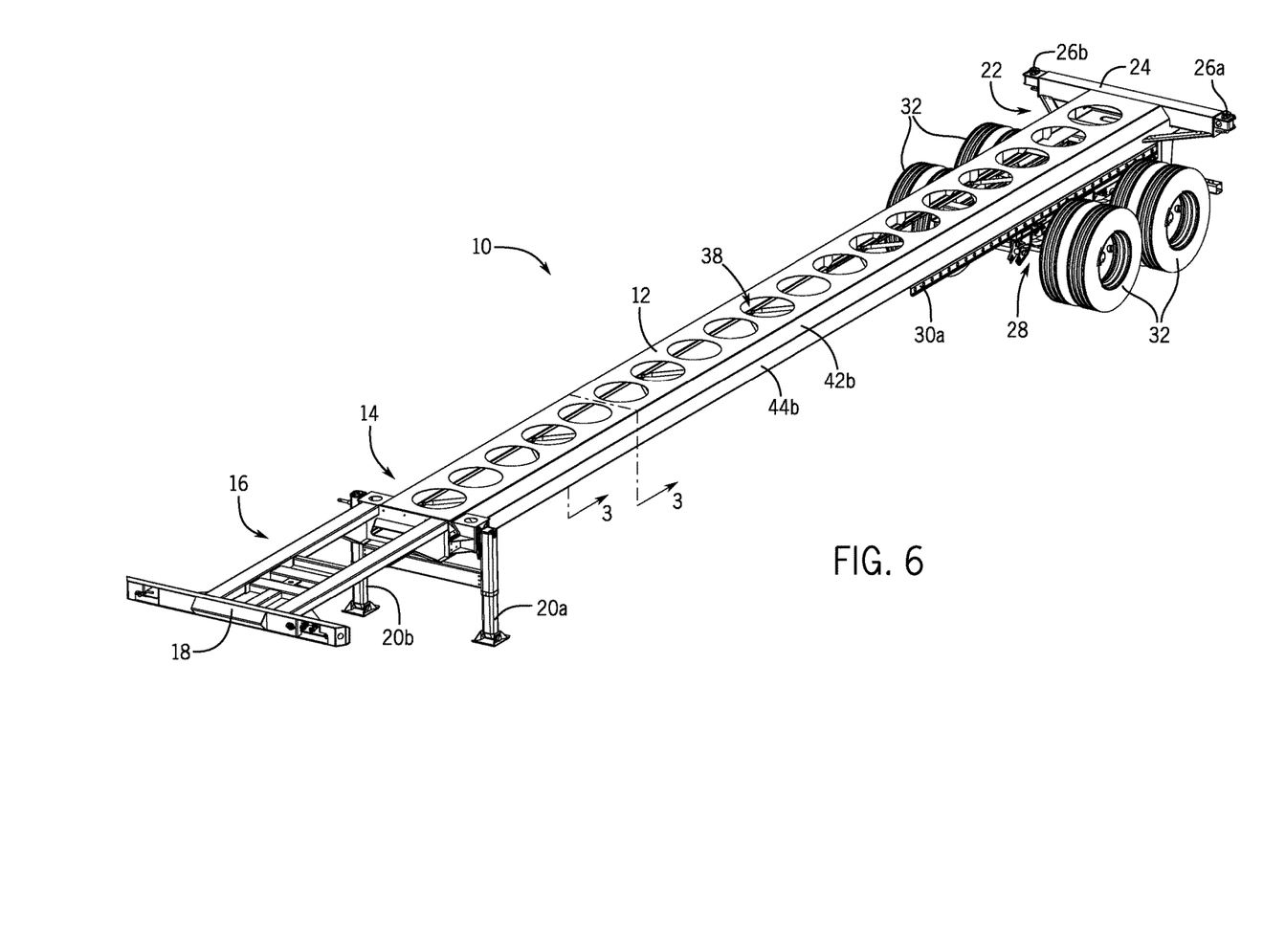
FIG. 6 illustrates an alternative view of the intermodal chassis of FIG. 5.

Referring to FIG. 4, a method for designing a main body for a trailer chassis will be described in further detail. As shown in box 402, the method includes selecting a known design of a main frame of a transportable load-supporting system that complies with industry standards regarding gross weight capacity. For example, the known main frame design could be that shown at 70 in FIG. 1, which is provided by China International Marine Containers (CIMC) USA, located in Monon, Ind. Although it can be assumed that many existing, known intermodal chassis comply with industry standards regarding gross weight capacity, and could therefore be used as models, it may be desirable to select a chassis that is specifically advertised as meeting such standards. One resource for such standards is the Association of American Railroads (AAR), which publishes the "Manual of Standards and Recommended Practices" for railroads. AAR Standards M930 and M931 provide limits on maximum gross weight (loading plus tare) for an intermodal container and an intermodal chassis, respectively. These limits, which vary based on the length of the container and chassis, can be used to develop baseline requirements for rigidities of the known chassis' components. It should be noted that many known chassis fulfill the AAR standards, not just the CIMC container shown in FIG. 1. Thus, many different types of chassis could be selected, modeled, and analyzed for purposes of establishing baseline rigidities.

To establish such baselines, the known chassis 80 can be modeled using a computer aided design program, such as AutoCAD or Solidworks, or PLM software such as NX by Siemens. An FEA analysis of the model can then be conducted using software such as ANSYS, Autodesk Simulation, or Solidworks Simulation. It should be noted that many other computer aided design programs and FEA analysis software exist and are suitable for either step of the process. After the model of the known chassis 80 is brought into the FEA program, a structural statics analysis can be performed. The designer can assign element types for each chassis component and input their material properties. Subassemblies can be built by assigning connectivity between the elements, and then loads can be applied to different locations on the chassis 80. For example, the AAR weight limits can be converted to loads by multiplying them by the force of gravity, and the total force allowed on the chassis can be resolved into appropriate forces on each chassis subassembly using rigid body equations. For example, forces will be concentrated at interface points between the chassis 80 and the container if the container slides forward, in which case the horn on the gooseneck 82 are engaged, or if it slides sideways or backwards, in which case the twistlocks 88a, 88b on the rear bolster 84 are engaged. By segmenting the chassis 80 into subassemblies, such as the gooseneck 82, the main frame 70, the rear bolster 84, etc., based on the static loading that would be encountered by the particular subassembly when the container moves with respect to the chassis 80, appropriate portions of the load can be assigned thereto. After such loads have been assigned, boundary conditions can also be input, and the FEA can be run.

As mentioned above, running the FEA on a known chassis such as that shown in FIG. 1 showed that the majority of load-carrying capacity is focused around the front gooseneck 82, the rear bolster 84, the rear-most section of the longitudinal members 72a, 72b, and the king pin nest 86. Because each of these loaded components directly or indirectly loads the main frame 70, the present inventors realized that any new design for a main frame needed to be rigid enough to resist longitudinal, lateral, torsional, and combined loadings due to acceleration and handling loads imposed on the chassis by the container. The baseline rigidities of the known main frame 70 determined by the FEA were then used as described below.

As shown in box 404, the method optionally includes calculating a polar moment of inertia, a vertical bending moment of inertia, and a lateral bending moment of inertia of the known main frame 70 given knowledge about the main frame's rigidity. For example, an FEA of the computer model of the known main frame 70 can be used to determine the deflection of the known main frame 70 in response to one or more of a torsional load, a vertical load, and a lateral load. Because the main frame 70 includes many complex components, its deflection in response to the above-mentioned loads was put into equations that allow the moments of inertia of a cantilever beam to be calculated. Using the FEA software, a given load was applied to the chassis model in each instance, and deflection of the main frame 70 was recorded and used to calculate the above-mentioned moments of inertia.

Figure 2:
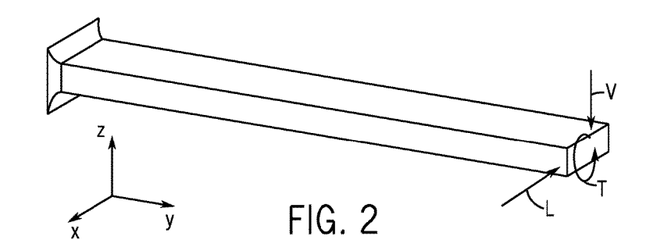
FIG. 2 is a schematic showing application of loads to a model of a chassis' main beam using finite element analysis software.

For example, FIG. 2 shows the main frame 70 modeled as a cantilevered beam, to which a torque load T has been applied at the free end. To determine the polar moment of inertia, two separate coordinates for a particular point on the free end of the main frame, one coordinate corresponding to a no-load situation, and one coordinate corresponding to a loaded situation, were recorded. The angle between two vectors pointing from a single origin to the two separate coordinates was then calculated using the dot product. This angle corresponded to a twist angle of the main frame 70 in response to the applied torsional load T. The twist angle can then be used to solve for the polar moment of inertia of the main frame using the equation:

$$J = \frac{TL}{G\phi}$$

where T is the applied torque, L is the length of the main frame, G is the shear modulus (e.g. for carbon steel), and $\phi$ is the calculated twist angle.

The method also includes determining a vertical deflection of the known main frame 70 when subject to a vertical load, and using the vertical deflection to calculate the vertical bending moment of inertia of the known main frame. For example, the frame's maximum deflection can be determined from the output of the FEA after a vertical load V has been applied to the free end of the main frame. The maximum deflection can then be used to calculate the vertical bending MOI using the equation:

$$I_{ZZ} = \frac{Pl^3}{3Ev_{max}}$$

where P is the concentrated load. L is the length of the main beam, E is the modulus of elasticity (e.g. for carbon steel), and $v_{max}$ is the maximum vertical deflection.

The method also includes determining a lateral deflection of the known main frame 70 when subject to a lateral load, and using the lateral deflection to calculate the lateral bending moment of inertia of the known main frame. The FEA software can be used to find the directional deformation in the x-direction (lateral direction) when a load L in the x-direction is applied. The same equation as above can be used to calculate the lateral bending MOI:

$$I_{XX} = \frac{Pl^3}{3Ev_{max}}$$

where P, l, and E are defined above, and $v_{max}$ is the directional deformation in the x-direction.

The results of the FEA analysis therefore allow one to examine how the known chassis 80 would respond to a particular applied loading based on its modeled connection points between subassemblies. The scalar value of the load (T or P) used to calculate deflections does not matter in-and-of itself, so much as the fact that MOIs that can be calculated from the response to such loading (i.e. deflection). These MOIs can then be used to develop a cross-sectional shape for a design for a monocoque main beam, as will be described below. It should be noted that the known main beam need not be modeled and analyzed using FEA, and that the vertical, lateral, and torsional MOIs as well as the vertical and lateral deflections and angle of twist could be obtained in other manners. For example, the MOIs of the known main frame 70 can be calculated using the structural dimensions of the two main longitudinal members 72a, 72b, and ignoring the cross-members 74, 76 and other components. This will give an approximation of the frame's MOIs and the baseline rigidities required, which can then be used to develop the cross-sectional shape for a new monocoque main beam. As additional examples, any of these values might be published by a third party or already known to the manufacturer or retailer of a known chassis. Alternatively, an actual chassis may be tested to determine the values.

Continuing to box 406, the method next includes developing a monocoque main beam having a polar moment of inertia, a vertical bending moment of inertia, and a lateral bending moment of inertia that are respectively greater than or substantially equal to the polar moment of inertia, the vertical bending moment of inertia, and the lateral bending moment of inertia of the known main frame 70. In one example, the MOIs of the monocoque main beam are greater than those of the known main frame 70, thus providing the monocoque main beam with greater rigidity and resistance to deformation. In other examples, the MOIs of the monocoque main beam are substantially equal to the MOIs of the known main frame 70, such as for example by being within +/−5% of each respective MOI calculated for the main frame 70. As noted above, the monocoque main beam is comprised mainly of a single longitudinally-extending sheet of material, one example of which can be seen in FIG. 5 at reference numeral 12. Other shapes of main beams could be developed, as will be explained further below.

The cross-sectional shape of the monocoque main beam is determinative of its moment of inertia. Thus, the method may include calculating polar moments of inertia, vertical bending moments of inertia, and lateral bending moments of inertia of a plurality of monocoque main beam designs having different cross-sectional shapes in order to determine which of the plurality of monocoque main beam designs have polar moments of inertia, vertical bending moments of inertia, and lateral bending moments of inertia that are greater than or substantially equal to the polar moment of inertia, the vertical bending moment of inertia, and the lateral bending moment of inertia of the known main frame design. The cross-sectional shape need not necessarily be designed in a vacuum, however, due to geometric requirements that the other subassemblies (e.g. gooseneck, rear bolster, suspension assembly) impose on the main beam. For example, the method for designing the monocoque main beam may include selecting a height and a width of the monocoque main beam that are substantially the same as a height and a width of the known main frame 70. This may be desirable if the monocoque main beam is to be used with typical, known suspension assemblies, bogeys, etc. These two dimensions (height and width) would then define an envelope within which the monocoque main beam's cross-sectional shape should fit.

In one example, a cross-sectional shape for the main beam can be back-calculated, such as by using the known equations for MOIs of a hollow rectangle, and solving for an inner height and width of the rectangle given its known external height and width per the known envelope. In other examples, instead of using a hollow rectangle as a basic cross-sectional shape, a hollow cylinder, square, ellipse, semi-circle, semi-rectangle, trapezoid, or other shape that provides a good base for connection to a suspension system, gooseneck, and rear bolster could be chosen. In still other examples, a designer might select a cross-sectional shape that is likely to result in success after some trial and error calculation of MOIs of various iterations of the shape. For instance, the initially chosen shape could be modified once its MOIs are close to those of the known main frame, and new MOIs of the modified shape could be re-calculated. Modifying the shape might include rounding its corners, adding diagonal edges to its corners, adding material thickness to certain areas of cross-section, removing one or more sides of the shape, etc. The modifications might be made with any number of factors in mind besides changing the MOIs, such as but not limited to reducing the main beam's weight, providing an area for connection to the suspension assembly, providing for easier manufacturing, etc. The MOIs are re-calculated after such a modification is made to see if they are greater than or substantially equal to those of the known main frame.

In another example, keeping in mind that that the cross-sectional shape has to yield particular section inertias and has to remain under a particular cross-sectional area, an initial shape can be modeled in CAD and its section inertias can be automatically calculated by the CAD software. For example, models of the plurality of monocoque main beam designs may be drawn in a computer-aided design program, which can be used to calculate the polar moments of inertia, vertical bending moments of inertia, and lateral bending moments of inertia of the plurality of monocoque main beam designs. Using CAD to calculate MOIs of various cross-sectional shapes may be especial helpful because specifications such as the type of material and its thickness can be easily varied, and the MOIs quickly re-calculated to determine the resulting effect. The shape itself can also be modified easily for purposes of calculating MOIs of various iterations of the shape.

Figure 3:
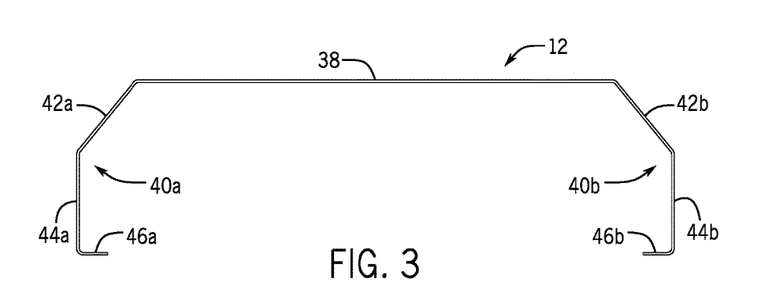
FIG. 3 illustrates a cross-sectional view of a main beam of a chassis according to the present disclosure, taken along the line 3-3 of FIG. 6.

In the present example, as shown in FIG. 3, a continuous, somewhat trapezoidal cross-sectional shape with an open bottom was chosen due to manufacturing capabilities. (Note that this cross-sectional shape extends in a longitudinal direction into and out of the page, see FIG. 6.) Because the trapezoidal single beam shown here can be roll-formed (as shown) or molded in one step, it provides advantages over welded main frames known in the art. Thus, ease of manufacturing may also play a part in selection of a cross-sectional shape for the monocoque main beam.

As shown at box 408, the method additionally includes determining a deflection of the known main frame 70 and a deflection of the monocoque main beam 12 in response to application of at least one of a torsional load T, a vertical load V, and a lateral load L to the known main frame 70 and to the monocoque main beam 12. This can be done, for example, by conducting a finite element analysis of a computer model of the monocoque main beam 12 to determine whether a twist angle, a vertical deflection, and a lateral deflection of the monocoque main beam 12 are less than or substantially the same as the twist angle, the vertical deflection, and the lateral deflection of the known main frame 70 when the monocoque main beam 12 is subject to the torsional load T, the vertical load V, and the lateral load L. In other words, the angle of twist, vertical deflection, and directional lateral deflection of the known main frame 70 can be compared to the same calculated values for the newly-designed monocoque main beam 12. All cross-sectional shapes of the main beam 12 that looked promising based on their calculated MOIs (see box 406) can be tested, or a select few cross-sectional shapes that are particularly desirable for manufacturing, aesthetic, ease of use, or other purposes could be tested first. Testing the monocoque main beam 12 for its deflection provides another criteria in addition to MOI by which to ascertain whether the monocoque main beam will perform substantially the same as or better than the known main frame when in use.

To test the deflection of the monocoque main beam 12, the monocoque main beam 12 should be modeled to have the same length as the known main frame 70 for purposes of correct comparison. For instance, using the CAD software, the cross-sectional shape being tested can be extended in a longitudinal direction to the length of the known main frame. Additionally, for the FE portion of the analysis, the same loads should be applied at the same locations to the main beam 12 as were applied to the main frame 70 (see FIG. 2). So long as the values of the loads applied and their points of application are the same, a one-to-one comparison can be made between the two modeled structures. The FEA is done to show that no matter what load is encountered, the new and old main body structures will have approximately the same amount of deflection (e.g. +/−5%) in response to the same loads. In other examples, the two main body structures may not have approximately the same amount of deflection, but the monocoque main beam 12 may have much less deflection than the known main frame 70.

During development of the presently disclosed monocoque main beam 12, the inventors realized that an open cross-section, such as that shown in FIG. 3, did not yield the required polar moment of inertia J and was susceptible to twisting to a large degree under a torque load T. However, at least a partially open cross-section was desirable both to limit the beam's weight, as well as to provide an area for a suspension assembly 28 to attach to the main beam 12. Thus, the method for designing the monocoque main beam 12 may also include adding cross-members 48 (FIG. 8) to the monocoque main beam 12 until the deflection of the monocoque main beam 12 is less than or substantially the same as the deflection of the known main frame 70, as shown at box 410 (FIG. 4). The cross-members 48 stiffen the main beam 12 against torsional deflection, while keeping the bottom profile open for connection to the suspension assembly 28. Because the geometric envelope of the present chassis 10 is the same as that of the known chassis 80 of FIG. 1, a standard two-pin or four-pin slider box and suspension assembly 28 can then be used.

By following the above-described method, a main body structure for a chassis can be developed, which includes a single main beam 12 having a cross-sectional shape that is specifically designed to have MOIs that are greater than or substantially equal to that of a known chassis 80 and deflections that are less than or substantially equal to that of the known chassis 80. The present design shown in FIGS. 5-9 employs the use of a monocoque main beam 12 built from metal or composite. If made of metal, the main beam may be made using brake press, extrusion, or roll forming techniques and machinery. If made of composite, the main beam may be made using open- or closed-molding composite techniques.

Still referring to FIGS. 5-9, an intermodal chassis 10 according to the present disclosure (and designed according to the present method) is shown. The chassis 10 includes a single longitudinally-extending main beam 12. A front end 14 of the main beam 12 is coupled to a gooseneck assembly 16. The gooseneck assembly 16 is configured to support a front end of an intermodal container. More specifically, the gooseneck assembly 16 includes a front bolster 18 ("horn"), which has two laterally-extending arms for resisting longitudinal translation of a container on the chassis 10. At the front end 14 of the main beam 12, support legs 20a, 20b ("landing gear") are provided just before the gooseneck assembly 16. The support legs 20a, 20b are adjustable in height so that they can hold the chassis 10 level with respect to the ground, or raise the front end 14 of the chassis 10 to allow it to be coupled to a vehicle via a kingpin 17 (FIG. 8) located in the gooseneck assembly 16.

At a rear end 22 of the main beam 12 is provided a rear bolster 24 having laterally-extending arms for supporting the rear end of an intermodal container. Together, the main beam 12, gooseneck assembly 16, and rear bolster 24 support the intermodal container (or flatrack). The container can also be locked to the chassis 10, for example by way of twistlocks 26a, 26b provided at the lateral extent of each arm of the rear bolster 24. The twistlocks 26a, 26b fit into female fitments on the container, as is known. More locking areas can be provided along the length of the chassis 10, including along the main beam 12 and/or at the ends of the arms on the front bolster 18.

Proximate the rear end 22 of the main beam 12, the main beam 12 is also coupled to a suspension assembly 28, including wheels 32, axles 34, and other suspension-related components, such as shocks, struts, brakes, etc. The suspension assembly 28 may slide along rails 30a, 30b that are coupled on either side of the main beam 12. This allows the suspension assembly 28 to be slid along the length of the rails 30a, 30b, and its position to be adjusted with respect to the main beam 12. The suspension assembly 28 has a supporting frame with two side members 36a, 36b (FIG. 9), which can be aligned with the rails 30a, 30b, respectively. Once aligned, pins or other fasteners in the suspension's supporting frame can be extended from the side members 36a, 36b into locating holes in the rails 30a, 30b, to lock the suspension assembly 28 at a chosen position. It should be noted that standard, off-the-shelf suspension assemblies/systems can be used because the geometric envelope of the main beam 12 lies within the envelope of a conventional main frame design that utilizes I-beams or C-beams. In other words, customized suspension systems are not necessarily required.

Now referring back to FIG. 3, an exemplary cross-sectional shape of the main beam 12 will be described in more detail. As noted above with regards to the FEA design methodology, the single longitudinally-extending main beam 12 has a cross-sectional shape designed to limit one or more of vertical, lateral, and torsional deflections of the main beam 12, which deflections result from loadings due to acceleration of the chassis 10 by a vehicle and handling of an intermodal container supported by the chassis 10. Again, as described above, the cross-sectional shape of the main beam 12 is designed to resist the deflections at least as well as a similarly-sized prior art intermodal chassis main frame, such as the chassis main frame 70 shown in FIG. 1, which is made of two longitudinal members 72a, 72b spaced apart by a plurality of lateral cross-members 74 and diagonal cross-members 76.

FIG. 3 shows how the main beam 12 comprises a longitudinally extending top surface 38 and first and second longitudinally extending side surfaces 40a, 40b depending downwardly from opposite edges of the top surface 38. More specifically, each of the first and second side surfaces 40a, 40b respectively comprises a first portion 42a, 42b sloping downwardly and outwardly from the respective edge of the top surface 38, and a second portion 44a, 44b depending vertically downwardly from a lower edge of the first portion 42a, 42b. A lower extent of each of the first and second side surfaces 40a, 40b may comprise a flange 46a, 46b, which flange 46a, 46b is connected by a radius to the vertically-extending second portions 44a, 44b, respectively. The first and second longitudinally-extending flanges 46a, 46b project inwardly from the second portions 44a, 44b of the first and second side surfaces 40a, 40b of the main beam 12, respectively. Each of the differently-angled surfaces may be integral with one another along the longitudinal edges where they connect so as to provide strength and reliability to the main beam structure. Such integral design can be accomplished by the manufacturing techniques mentioned herein above, including but not limited to molding or roll-forming. In other examples, portion(s) of the main beam 12 can be welded or fastened to an otherwise integrally-formed portion of the main beam.

Figures 7, 8:
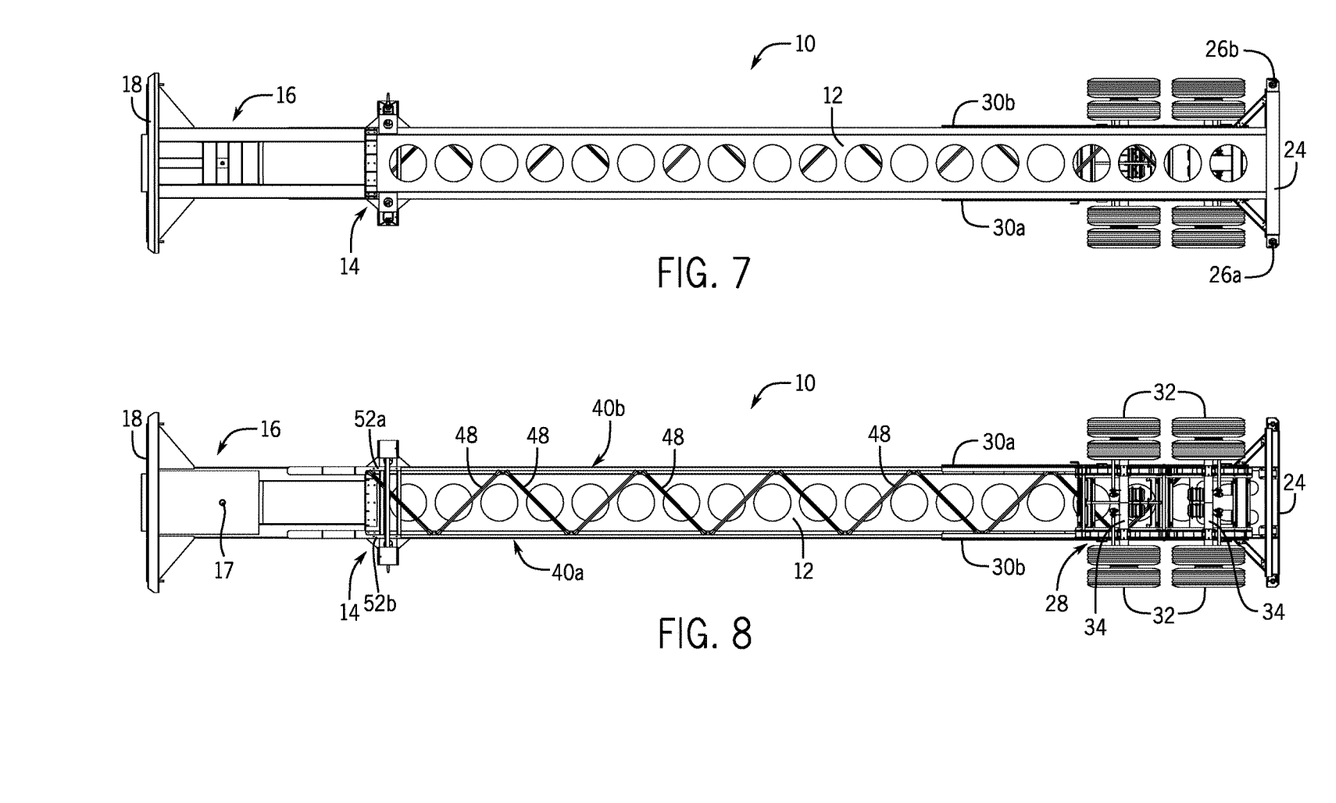
FIG. 7 illustrates a top view of the intermodal chassis.
FIG. 8 illustrates a bottom view of the intermodal chassis.
Figure 9:
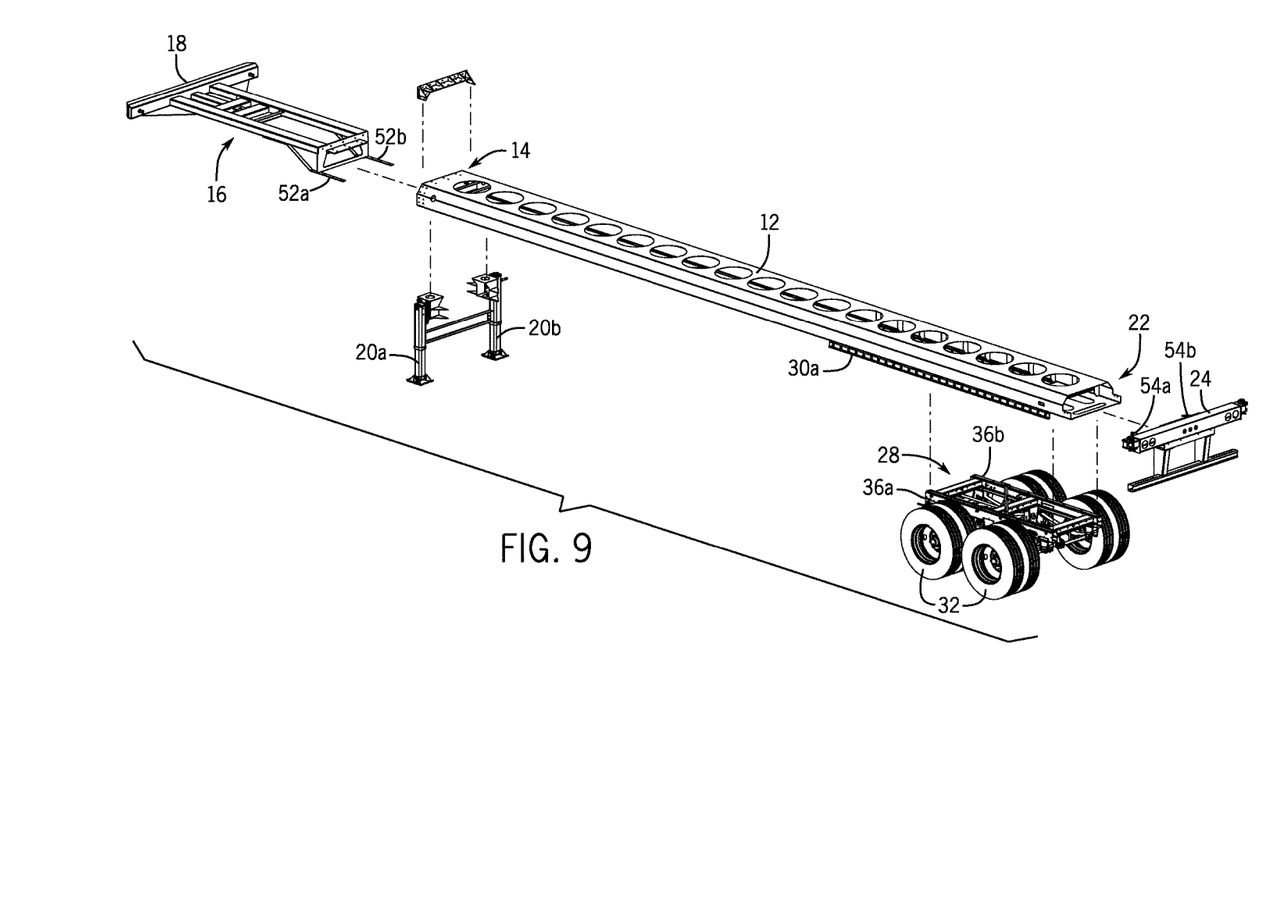
FIG. 9 illustrates an exploded view of the intermodal chassis.

Referring to FIG. 8, the chassis 10 may also include a plurality of generally laterally-extending cross-members 48 coupling a lower extent of the first side surface 40a to a lower extent of the second side surface 40b. Here, while the cross-members 48 extend generally laterally, they also extend diagonally from one side surface to the other, providing resistance against deformation due to an applied torque T. In one example, the cross-members 48 may be coupled to the upper or lower surfaces of the flanges 46a, 46b by welding, by gluing, by bolting (or using other mechanical connectors), or by any other type of suitable connection. As shown herein, each individual cross-member 48 has opposing ends that nearly meet the end of another cross member at the flanges 46a, 46b. In the example shown, each opposing end of each cross member is provided with a webbed flange to provide more surface area for connection to the side surfaces 40a, 40b. The cross-members 48 may be tubes formed of steel, another metal, or a composite. The tubes may have rectangular or cylindrical shape and may be solid or hollow. In one example, except for the plurality of cross-members 48, the main beam 12 is formed from a single sheet of roll-formed metal or as a single molded composite structure. The cross-members 48 are later added to the single beam structure to effectively "close" the open profile of the cross-sectional shape shown in FIG. 3 and increase the beam's polar MOI.

The flanges 46a, 46b allow the main beam 12 to be coupled to the other components of the chassis 10 in a configurable manner. For instance, the first and second longitudinally-extending rails 30a, 30b coupled to the lower extents of the first and second side surfaces 40a, 40b of the main beam 12, respectively, may in fact be coupled to the underside of the flanges 46a, 46b, such as by welding or with fasteners through vertically-oriented holes in the rails 30a, 30b. As mentioned above, the first and second rails 30a, 30b also have lateral through holes for pins/fasteners so as to allow the suspension assembly 28 to be positioned with respect to the main beam 12 and secured thereto via the rails 30a, 30b.

Some prior art designs implement a non-configurable means to provide a suitable connection point for a truck's fifth wheel or for differently-sized rear bolsters. In contrast, the present design is configurable: both the front gooseneck assembly 16 and rear bolster 24 are coupled to the main beam 12 via removable fastening mechanisms, such as but not limited to bolts. Depending upon the customer's needs and the configuration of the intermodal container to be held on the chassis 10, the chassis 10 can be provided with different types and shapes of gooseneck assemblies and/or rear bolsters. This allows the main beam 12 to accommodate containers having various geometric requirements. For example, some containers have a narrower tunnel section in the gooseneck than standard ISO intermodal containers and a wider rear bolster.

In the present example, the gooseneck assembly 16 is provided with first and second prongs 52a, 52b at is rearward facing end that sit below the first and second flanges 46a, 46b, respectively, at the front end 14 of the main beam 12 and are coupled thereto, such as by bolting. This also allows the chassis 10 to be re-configured, as a second main beam or a main beam extension could be provided between the gooseneck assembly 16 and the main beam 12 shown herein to extend the length of the chassis 10. Alternatively, a different type of gooseneck assembly could be provided. First and second prongs 54a, 54b can also be provided on the front end of the rear bolster 24 that sit atop the first and second flanges 46a, 46b, respectively, at the rear end 22 of the main beam 12 and are coupled thereto, such as by bolting. This also allow for re-configuration of the chassis 10. Alternatively, a different type of rear bolster could be provided.

Referring back to FIG. 3, the cross-sectional shape of the main beam 12 resembles a trapezoid sitting atop a rectangle, it being understood that the above-described shapes are hollow and neither shape is enclosed by a bottom side, other than the cross-members 48. The open profile of the main beam 12 (defined between the inner edges of flanges 46a, 46b) provides the ability to use both two- and four-pin slider suspension systems (e.g. suspension assembly 28) to target varied consumer cost brackets and/or to provide for connection of optional accessories to the chassis 10. However, providing diagonal cross-members 48 overcomes the otherwise reduced torsional rigidity that might result from a main beam 12 with a completely open profile. Because the above-described design process was used, the cross-sectional shape of the main beam 12 has a polar moment of inertia J, a vertical bending moment of inertia $I_{ZZ}$, and a lateral bending moment of inertia $I_{XX}$ that are greater than or substantially equal to a polar moment of inertia, a vertical bending moment of inertia, and a lateral bending moment of inertia of the known main frame 70 of FIG. 1. The main beam 12 is also designed such that the deflections of the main beam 12 are less than or substantially the same as one or more of respective vertical, lateral, and torsional deflections of a known main frame 70 of a transportable load-supporting system, such as an intermodal chassis 80, that complies with industry standards regarding intermodal trailer gross weight limits.

Referring back to FIG. 5, the top surface 38 of the main beam 12 may be provided with cutouts 50 along its length, which in the example shown are circular cutouts. Having cutouts 50 reduces the amount of metal or composite used to construct the main beam 12, and therefore reduces its weight. The size, shape, spacing, and number of cutouts 50 can be determined based on the type of material used to construct the main beam 12, its thickness, the hole size relative to width of the top surface 38, the presence or lack of any reinforcement around the cutouts 50, and any other considerations that might need to be taken into account to ensure that the main beam 12 exhibits no more than a desired amount of deflection in response to certain loading conditions. A circle was chosen as the shape of the cutouts 50 because it is the best for stress distribution. However, depending on size and spacing, as well as the material of the main beam 12, different shapes could be used. Excess material salvaged from the cut-out can be used elsewhere in chassis. For example, the material from the cutouts could be cut to make the plates of the front bolster 18. Upon testing using FEA, the circle cutouts were not detrimental to the chassis' ability to bear loads in terms of deflection. Other shapes of cutouts could be modeled and tested.

It should be understood that the FEA results described herein are used only to show that it is possible to create a cross-sectional shape for the main beam 12 of a chassis 10 that will exhibit the same or better properties as a prior art chassis structure employing more than one longitudinal member 72a, 72b (e.g. I-beams or C-beams) and a plurality of lateral and diagonal cross-members 74, 76. The exact cross-sectional shape of the exemplary beam 12 shown herein is not meant to be limiting on the scope of the present claims beyond what the claims themselves describe. In other words, many different cross-sectional shapes for a monocoque main beam will be able to provide the required MOIs and deflections. Alternative shapes are contemplated based on the type and thickness of the material used to create the main beam 12. Additionally, it is not required that the deflections of the proposed main beam 12 be exactly as noted herein; rather, the beam 12 is designed such that the deflections resulting from imposed loads are no more than they would have been had a prior art chassis been subjected to the exact same loading condition.

The present single beam system can be designed in such a way to allow for simple scaling of the main beam 12 so that the design can be used to construct all typical chassis lengths (20', 40', 45', and 53'). Additionally, the single beam system can be designed to allow for modular attachment of indexed main beam sections so that a shorter chassis can be converted to longer chassis lengths (20'+x'=53' . . . ). For example, bolt-in extensions to the main beam 12 could be used as a semi-permanent solution to the need for modular design; although the present chassis 10 can alternatively be constructed such that a first chassis portion can telescopically slide into a second chassis portion in order to vary its overall length, as is known. Additionally, the chassis 10 can be designed in order to expedite its repositioning and/or storage, and to aid in stacking of two or more chassis. Specific additional features (not shown, but described in Applicant's co-pending application Ser. No. 14/680,616, filed Apr. 7, 2015) designed to take advantage of the ability to support and stack this particular design can be permanently or removably provided. Certain components shown in the Figures can be made removable, foldable, or collapsible to allow for such repositioning, storage, and stacking.

Overall, assembly and manufacturing time for prior art chassis systems is significantly longer than for the proposed design. This is because the proposed chassis design has a reduced component count, a reduced weld quantity, and a reduced need for rotation during welding. This means that the cost of manufacturing and assembly associated with construction of intermodal chassis systems can be reduced, while satisfaction of structural requirements associated with required load cases can be maintained or improved upon.

Although the main beam 12 of the present design has been described with respect to use in an intermodal chassis 10, other types of frames could be constructed using similar techniques. The main beam section can be either molded or formed with a slight curvature (camber) so that the design can be used in alternative mobile or static products such as a flatbed trailer's main beam or a bridge section.

In the above description, certain terms have been used for brevity, clarity, and understanding. No unnecessary limitations are to be inferred therefrom beyond the requirement of the prior art because such terms are used for descriptive purposes and are intended to be broadly construed. The different assemblies and method steps described herein may be used alone or in combination with other assemblies or methods. It is to be expected that various equivalents, alternatives and modifications are possible within the scope of the appended claims.

What is claimed is:

1. An intermodal chassis comprising:
   a single longitudinally-extending main beam having a cross-sectional shape designed to limit one or more of vertical, lateral, and torsional deflections of the main beam, which deflections result from loadings due to acceleration of the intermodal chassis by a vehicle and handling of an intermodal container supported by the intermodal chassis;
   a gooseneck assembly coupled to a front end of the main beam, which is configured to support a front end of the intermodal container; and
   a rear bolster assembly coupled to a rear end of the main beam, which is configured to support a rear end of the intermodal container;
   wherein the main beam is designed such that the deflections of the main beam are less than or substantially the same as one or more of respective vertical, lateral, and torsional deflections of a known main frame of an intermodal chassis that complies with industry standards regarding intermodal trailer gross weight limits when the main beam and the known main frame are subjected to the same loadings;
   wherein the known main frame comprises at least two longitudinal members tied together with additional structural members extending at least one of laterally and diagonally between the at least two longitudinal members;
   wherein the known main frame has a known length, and the main beam has the same length as the known main frame; and
   wherein the intermodal chassis comprises no additional longitudinally-extending main beams other than the single longitudinally-extending main beam.

2. The intermodal chassis of claim 1, wherein the cross-sectional shape of the main beam has a polar moment of inertia, a vertical bending moment of inertia, and a lateral bending moment of inertia that are greater than or substantially equal to a polar moment of inertia, a vertical bending moment of inertia, and a lateral bending moment of inertia of the known main frame.

3. The intermodal chassis of claim 2, wherein the main beam comprises a longitudinally-extending top surface and first and second longitudinally-extending side surfaces depending downwardly from opposite edges of the top surface.

4. The intermodal chassis of claim 3, further comprising a plurality of cutouts in the top surface of the main beam.

5. The intermodal chassis of claim 3, further comprising a plurality of generally laterally-extending cross members coupling a lower extent of the first side surface to a lower extent of the second side surface.

6. The intermodal chassis of claim 5, wherein except for the plurality of cross members, the main beam is formed from a single sheet of roll-formed metal.

7. The intermodal chassis of claim 3, wherein each of the first and second side surfaces comprises a first portion sloping downwardly and outwardly from the respective edge of the top surface and a second portion depending vertically downwardly from a lower edge of the first portion.

8. The intermodal chassis of claim 7, further comprising first and second longitudinally-extending rails coupled to lower extents of the first and second side surfaces of the main beam, respectively, wherein the first and second rails have slots for fasteners so as to allow a suspension assembly to be positioned with respect to the main beam and secured thereto.

9. The intermodal chassis of claim 7, further comprising:
   first and second longitudinally-extending flanges projecting inwardly from the second portions of the first and second side surfaces of the main beam, respectively; and
   first and second prongs on the gooseneck assembly that sit below the first and second flanges, respectively, at the front end of the main beam and are coupled thereto.

10. The intermodal chassis of claim 9, further comprising first and second prongs on the rear bolster assembly that sit atop the first and second flanges, respectively, at the rear end of the main beam and are coupled thereto.

11. An intermodal chassis comprising:
    a single longitudinally-extending main beam having a cross-sectional shape designed to limit one or more of vertical, lateral, and torsional deflections of the main beam, which deflections result from loadings due to acceleration of the intermodal chassis by a vehicle and handling of an intermodal container supported by the intermodal chassis;
    a gooseneck assembly coupled to a front end of the main beam, which is configured to support a front end of the intermodal container; and
    a rear bolster assembly coupled to a rear end of the main beam, which is configured to support a rear end of the intermodal container;
    wherein the main beam is designed such that the deflections of the main beam are less than or substantially the same as one or more of respective vertical, lateral, and torsional deflections of a known main frame of an intermodal chassis that complies with industry standards regarding intermodal trailer gross weight limits when the main beam and the known main frame are subjected to the same loadings;
    wherein the known main frame comprises at least two longitudinal members tied together with additional structural members extending at least one of laterally and diagonally between the at least two longitudinal members;
    wherein the known main frame has a known length, and the main beam has the same length as the known main frame;
    wherein the cross-sectional shape of the main beam has a polar moment of inertia, a vertical bending moment of inertia, and a lateral bending moment of inertia that are greater than or substantially equal to a polar moment of inertia, a vertical bending moment of inertia, and a lateral bending moment of inertia of the known main frame; and wherein the main beam comprises a longitudinally-extending top surface and first and second longitudinally-extending side surfaces depending downwardly from opposite edges of the top surface.

12. An intermodal chassis comprising:
a single longitudinally-extending main beam having a cross-sectional shape designed to limit one or more of vertical, lateral, and torsional deflections of the main beam, which deflections result from loadings due to acceleration of the intermodal chassis by a vehicle and handling of an intermodal container supported by the intermodal chassis;
a gooseneck assembly coupled to a front end of the main beam, which is configured to support a front end of the intermodal container; and
a rear bolster assembly coupled to a rear end of the main beam, which is configured to support a rear end of the intermodal container;
wherein the main beam is designed such that the deflections of the main beam are less than or substantially the same as one or more of respective vertical, lateral, and torsional deflections of a known main frame of an intermodal chassis that complies with industry standards regarding intermodal trailer gross weight limits when the main beam and the known main frame are subjected to the same loadings;
wherein the known main frame comprises at least two longitudinal members tied together with additional structural members extending at least one of laterally and diagonally between the at least two longitudinal members;
wherein the known main frame has a known length, and the main beam has the same length as the known main frame; and
wherein the main beam comprises a longitudinally-extending top surface and first and second longitudinally-extending side surfaces depending downwardly from opposite edges of the top surface.

13. The intermodal chassis of claim 12, further comprising a plurality of cutouts in the top surface of the main beam.

14. The intermodal chassis of claim 12, further comprising a plurality of generally laterally-extending cross members coupling a lower extent of the first side surface to a lower extent of the second side surface.

15. The intermodal chassis of claim 14, wherein except for the plurality of cross members, the main beam is formed from a single sheet of roll-formed metal.

16. The intermodal chassis of claim 12, wherein each of the first and second side surfaces comprises a first portion sloping downwardly and outwardly from the respective edge of the top surface and a second portion depending vertically downwardly from a lower edge of the first portion.

17. The intermodal chassis of claim 16, further comprising first and second longitudinally-extending rails coupled to lower extents of the first and second side surfaces of the main beam, respectively, wherein the first and second rails have slots for fasteners so as to allow a suspension assembly to be positioned with respect to the main beam and secured thereto.

18. The intermodal chassis of claim 16, further comprising:
first and second longitudinally-extending flanges projecting inwardly from the second portions of the first and second side surfaces of the main beam, respectively; and
first and second prongs on the gooseneck assembly that sit below the first and second flanges, respectively, at the front end of the main beam and are coupled thereto.

19. The intermodal chassis of claim 18, further comprising first and second prongs on the rear bolster assembly that sit atop the first and second flanges, respectively, at the rear end of the main beam and are coupled thereto.

* * * * *